United States Patent
Hauser-Lienhard

[15] 3,645,077
[45] Feb. 29, 1972

[54] HAYMAKING MACHINE

[72] Inventor: Hans Ulrich Hauser-Lienhard, Watt, Zurich, Switzerland

[73] Assignee: Bucher-Guyer AG Maschinenfabrik, Niederweningen, Zurich, Switzerland

[22] Filed: Aug. 14, 1969

[21] Appl. No.: 850,045

[30] Foreign Application Priority Data

Aug. 27, 1968 Switzerland ..................12824/68

[52] U.S. Cl....................................56/366, 56/370, 56/377
[51] Int. Cl. ..............................................A01d 79/02
[58] Field of Search ..........................56/370, 377, 365–369

[56] References Cited

FOREIGN PATENTS OR APPLICATIONS 244,670  1/1966  Austria......................................56/370
263,434  7/1968  Austria......................................56/366
1,367,040  6/1964  France......................................56/370
1,505,378  6/1968  France......................................56/370
6,709,476  1/1968  Netherlands...............................56/366
448,597  4/1968  Switzerland..............................56/377

Primary Examiner—F. Barry Shay
Assistant Examiner—J. N. Eskovitz
Attorney—Hill, Sherman, Meroni, Gross & Simpson

[57] ABSTRACT

A haymaking machine having two rake wheels mounted for rotation about vertical shafts at both ends of an arm pivotable in a horizontal plane, both rake wheels being supported by ground wheels. The first of said rake wheels is stationary with respect to the line of travel of the machine and the second rake wheel arranged in the rear of the first wheel, can be shifted laterally by means of said pivotable arm towards one or the other side of the line of travel of the machine with respect to said first wheel and can be locked in its lateral shifted position.

7 Claims, 7 Drawing Figures

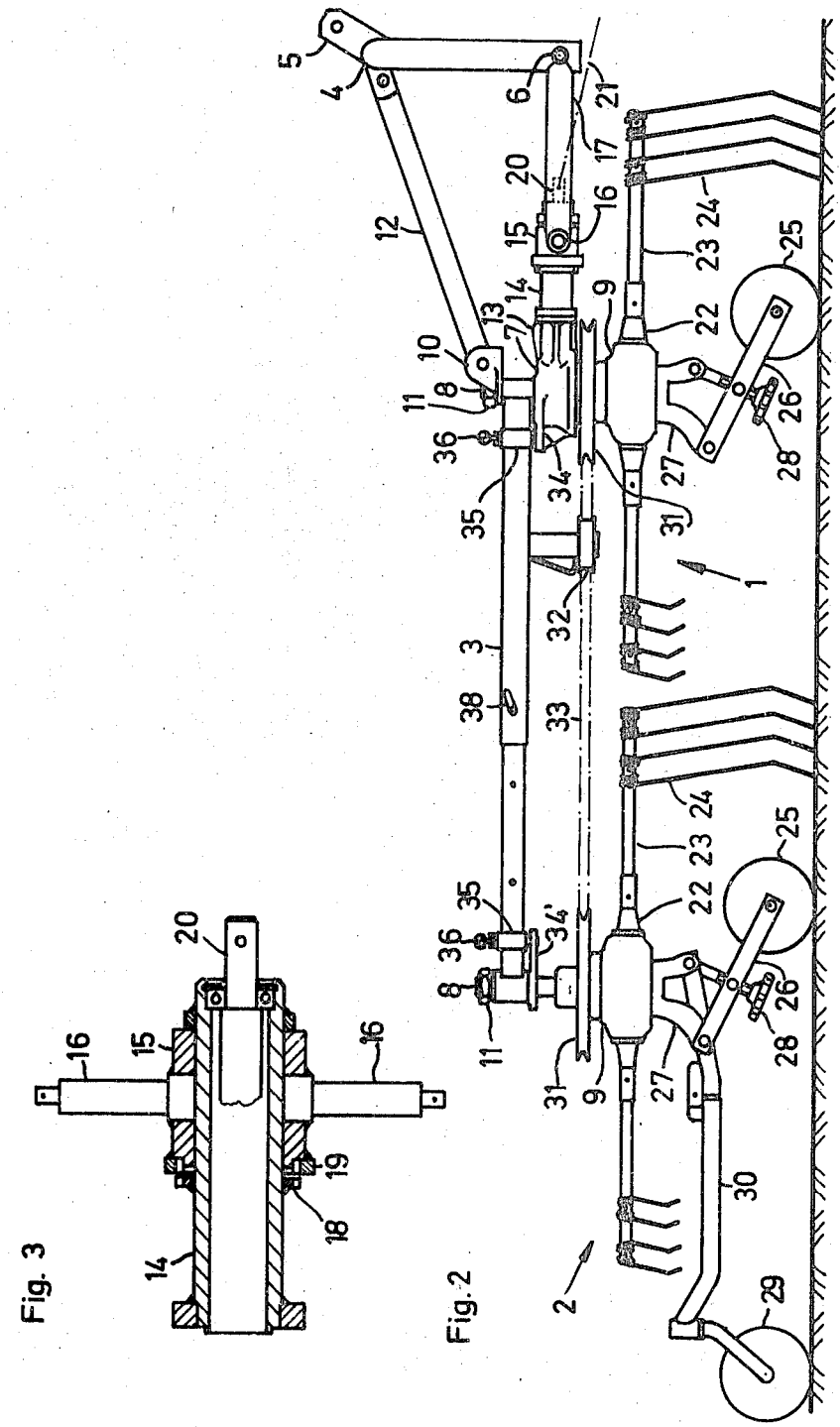

INVENTOR.
HANS-ULRICH HAUSER-LIEHARD
ATTORNEYS

INVENTOR.
HANS-ULRICH HAUSER-LIENHARD

HAYMAKING MACHINE

The present invention relates to a haymaking machine of the kind having a pair of rake wheels supported by ground wheels and driven for rotation about vertical shafts, the two rake wheels being mounted each at one end of an arm pivotable in a horizontal plane.

In a known machine of this kind, the arm according to the desired use of the machine, not only may be pivoted and ajusted in length, but also the direction of rotation of one rake wheel may be reversed, so that the rake wheels rotate in the same direction for performing certain operations and in opposite directions for other operations. The cost of construction of such a machine is quite considerable, particularly of the component parts for the drive of the rake wheels in the case of longitudinally adjustable arms. Moreover, such a machine requires a comparatively long adjustment time. The usually controlled rake tines must always be adapted to the actual direction of rotation of the rake wheel.

In another similar machine having rake wheels arranged in pairs and driven in opposite directions, additional devices, e.g., ray-shaped rake wheels, have to be arranged for carrying out the different operations, and this again increases constructional expenses and consequently complicates the steps of adjustment from one to the other mode of operation.

The invention has for its object to provide a haymaking machine wherein the necessary costs of construction are considerably lower compared with those of the known machines.

The invention is based on the knowledge that the effect of the machine having a pair of rake wheels is not primarily a function of the relative position of one rake wheel with respect to the other, but (in the case of constant direction of rotation of the rake wheels) of the relative position of each individual rake wheel with respect to the travelling axis of the machine.

In the machine according to the invention the first of said rake wheels is stationary with respect to the line of travel of the machine, and the second rake wheel, as viewed in the direction of travel, can be shifted by means of said pivotable arm towards one or the other side of the line of travel with respect to said first rake wheel and can be locked, in said shifted position. When the second rake wheel is swung to one side, each rake wheel operates independently, i.e., two swaths are formed at low speed of the rake wheels, or at high speed the machine operates as tedder, while when the second rake wheel is swung to the other side, both rake wheels cooperate, i.e., the hay collected by the first rake wheel will be delivered to the second and only one larger swath is formed. This applies not only when both rake wheels are driven in opposite direction but also when they are driven in the same direction.

The invention will now be described in greater detail with reference to the accompanying drawings, in which:

FIG. 2 is a side elevation of the haymaking machine,

FIG. 3 shows a detail of the haymaking machine drawn to a larger scale,

Figure 1:
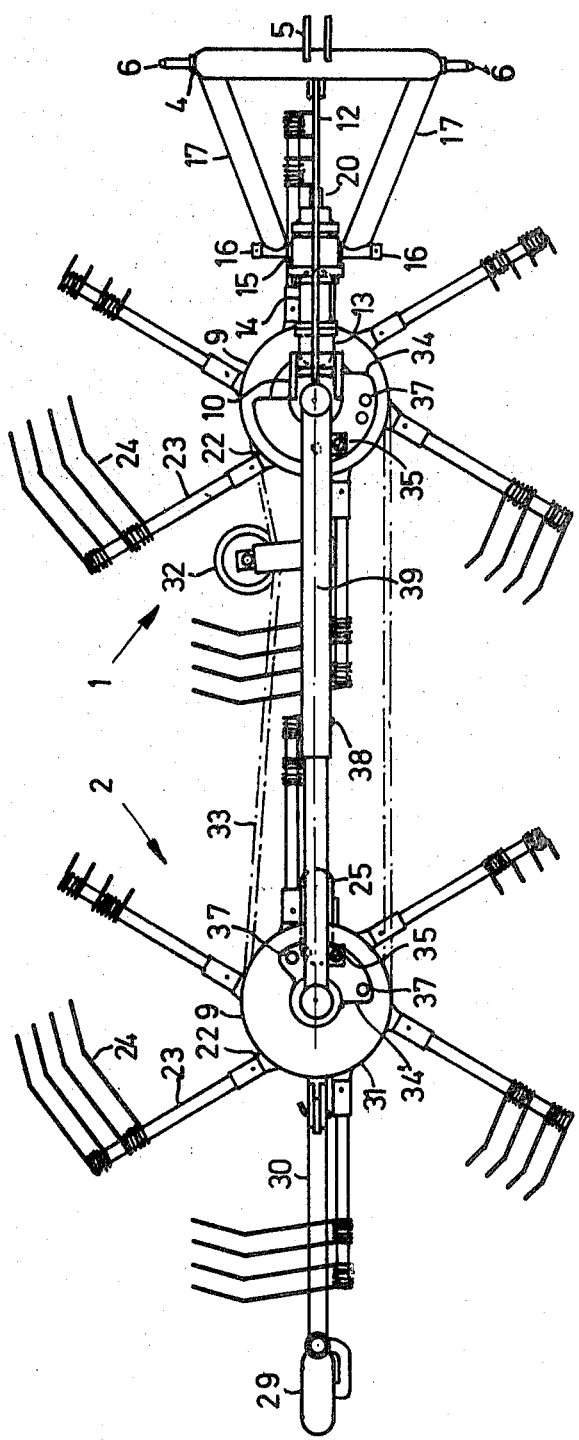
FIG. 1 is a plan view of the haymaking machine according to the invention.

The haymaking machine illustrated in FIGS. 1 and 2 comprises a front rake wheel 1 and a rear rake wheel 2, which wheels are operatively connected together by means of an arm 3. The front rake wheel 1 is linked to a coupling frame 4 by means of which the haymaking machine is connected at an upper pivot 5 and two lower pivots 6, to the three-point linkage of a tractor. A gearbox 7 is arranged above the front rake wheel 1 through which box extends a stationary vertical shaft 8. A control housing 9 is rotatably mounted on this vertical shaft 8 below the gearbox 7. Above the gear housing 7, the arm 3 is pivotally mounted. With the interposition of a fishplate 10, the arm 3 is fixed to the vertical shaft 8 by means of a nut 11. The fishplate 10 is hinged to one end of a strut 12 of the coupling frame 4. A neck 13 of the gearbox 7 is extended by a flanged carrier tube 14, which is rotatably mounted in a sleeve 15 (FIG. 3), which is provided with two journal pins 16 to each of them is hingedly connected an arm 17 of the coupling frame 4. In the position of operation, i.e., when the rake wheels are lowered on the ground, the haymaking machine may freely pivot up and down about the horizontal axis of the journal pins 16 extending transversely with respect to the direction of travel, and can thereby follow the unevenness of the ground. An external gear ring 18 is mounted on the carrier tube 14 and facing said gear ring, the front of the sleeve 15 is formed with an internal gear ring 19. In the position shown in FIG. 2, axial clearance is provided between the outer gear ring 18 and the inner gear ring 19, so that the carrier tube 14 is free to rotate in the sleeve 15 and the haymaking machine can effect tilting movements with respect to the coupling frame 4 about the horizontal axis of the support formed by tube 14 and sleeve 15 and extending in the direction of travel. In this manner, the haymaking machine may also follow the unevenness of the ground in transverse direction with respect to the direction of travel. When the hydraulically controlled lifting gear of the tractor is actuated, i.e., when the haymaking machine suspended on the coupling frame 4 is lifted, a traction force acts on the strut 12 which pulls the carrier tube 14 in the sleeve 15 forwards and inserts the external gear ring 18 into the internal gear ring 19. This engagement of the carrier tube 14 with the sleeve 15 eliminates the transverse mobility of the haymaking machine on the coupling frame 4, and the haymaking machine is held in locked position by the tractor and raised from the ground for transportation.

With the lowering of the haymaking machine on the ground into operating position, the ground resistance of the haymaking machine opposing the traction force of the tractor allows the external gear ring 18 automatically to disengage from the internal gear 19, whereby the machine is again transversely movable on the coupling frame 4.

A drive shaft 20 passes through the carrier tube 14 and its end projecting out of the carrier tube 14 may be brought into driving connection with the power takeoff of the tractor, by means of a universal joint shaft 21. The front rake wheel 1 is rotatably driven by the drive shaft 20 via bevel gearing (not shown) housed in the gearbox 7. The rear wheel 2 also is associated with a control housing 9 rotatably mounted on a vertical shaft 8. Rake tine carriers 23 are rotatably mounted in bearings 22 on said housings 9. The rake tine carriers 23 are controlled by a cam inside the control housing 9 in such a manner that during rotation of rake wheels 1 and 2, the tines 24 fixed to the ends of the rake tine carriers 23, in one control area, are in contact with the ground in raking position and in another control area are brought into nonraking position by a pivoting movement away from the ground.

Both rake wheels 1 and 2 can travel over the ground each with the aid of a supporting roller 25. The supporting rollers 25 are carried by an arm 26 pivotally mounted on a bracket 27 which is fixed to the lower end of the shafts 8, and are adjustable by means of a handwheel operated screw spindle 28. The rear wheel 2 in addition is provided with a trail roller 29 which is detachably fixed by an arm 30 to the bracket 27 and which travels in the track of the ground wheel 25.

On each of the two rotatable control housings 9 of the rake wheels 1 and 2, there is secured a V-belt pulley 31 around which passes a V-belt 33 adapted to be tightened by an idler 32. Thus, the front rake wheel 1 drives the rear rake wheel 2, and both rake wheels turn in the same direction of rotation.

An adjusting segment 34 is secured to the gearbox 7 above the front rake wheel 1, and a further adjusting segment 34' is fixed to the vertical shaft 8 of the rear rake wheel 2. At both ends of the arm 3, cotter pins 36 are held in guides 35, said pins being engageable in holes 37 in the adjusting segments 34 and 34'.

The arm 3 is constructed as a telescopic tube whose length is adjustable and the tube sections can be locked in adjusted position by means of a bolt 38.

In FIGS. 1 and 2, the vertical shafts 8 of the two rake wheels 1 and 2 are situated behind one another in the longitudinal axis 39 of the line of travel.

For transportation, the haymaking machine, in the position of the rear rake wheel 2 as shown in FIGS. 1 and 2, is lifted from the ground by the tractor hydraulics. By shortening the arm 3, the rear rake wheel 2 is advantageously pushed towards the front rake wheel 1 in order to obtain the smallest length of overhang.

Figure 4:
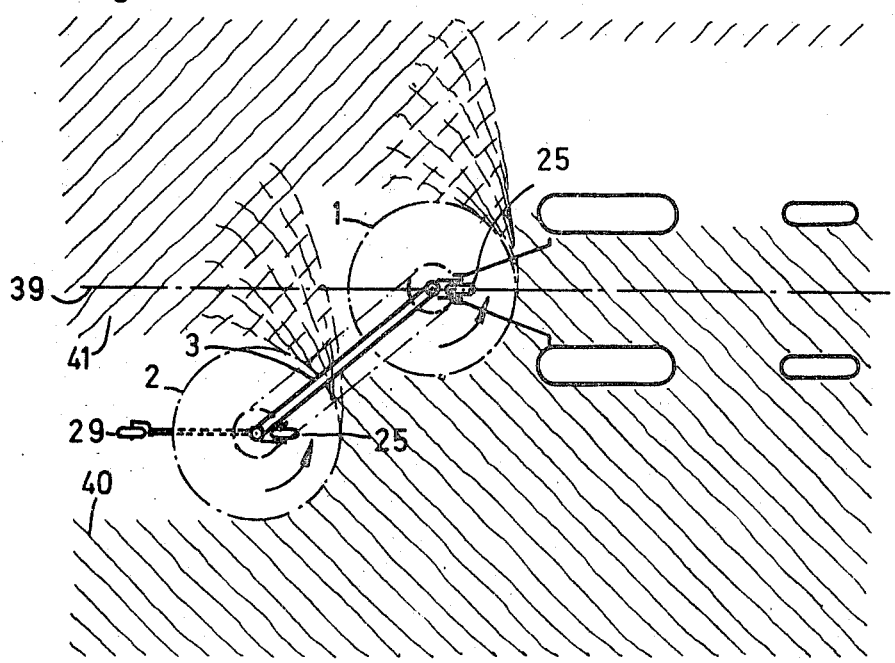
FIGS. 4 to 7 are diagrammatic illustrations of four different manners of operation of the haymaking machine.

FIG. 4 shows the haymaking machine while tedding hay spread over the ground, the hay before tedding being designated by 40 and after tedding by 41. The arm 3 has been locked in such a position on the adjusting segment 34 of the front rake wheel 1, that the rear rake wheel 2 is situated on the right-hand side of the longitudinal axis 39 when viewed in the direction of travel of the machine in FIG. 4. In order that the supporting roller 25 of the rear rake wheel 2 again moves parallel to said longitudinal axis 39, the position of the adjusting segment 34' of the rear rake wheel 2 on the arm 3 must be correspondingly altered and locked.

Figure 5:
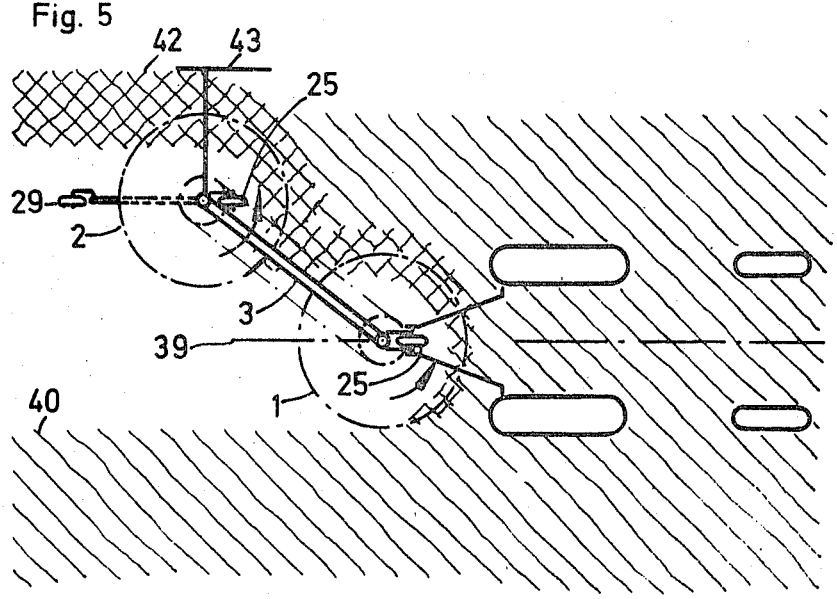

As shown in FIG. 5 the rear rake wheel 2 is swung towards the left with respect to the longitudinal axis 39 of the direction of travel of the machine. With both rake wheels 1 and 2 cooperating, hay 40 lying on the ground is, in this operating position of the machine, conveyed to the side and raked together to form a swath 42. For shaping the swath 42 more exactly, a swath plate 43 may be arranged at the side of the rear rake wheel 2.

Figure 6:
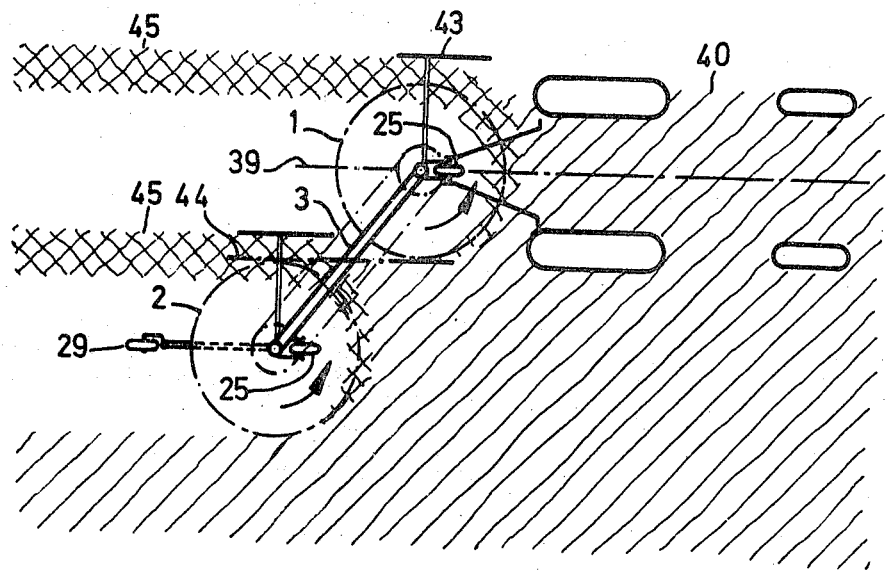
Figure 7:
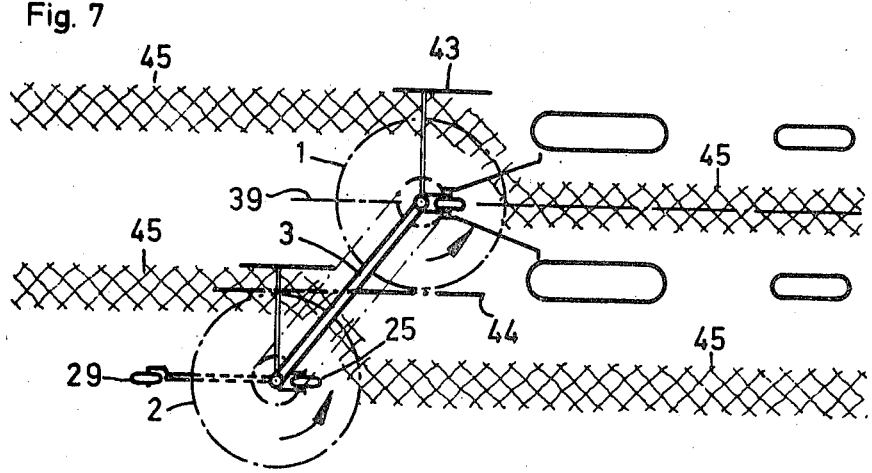

In FIGS. 6 and 7, the rear rake wheel 2 is swung towards the right with respect to the longitudinal axis 39 as viewed in the direction of travel of the machine, so far that a tangent 44 touching both rake wheels on adjacent sides extends substantially parallel to the longitudinal axis 39. In an operating position as shown in FIG. 6, each of the two rake wheels 1 and 2 rakes the hay 40 strewn flat over the ground to form windrows 45. In the same operating position, as shown in FIG. 7, both windrows 45 are turned over again in one operating step. For both types of operation, it may be advantageous to use a swath plate 43.

In each operating position of the rear rake wheel 2 swung to the left or to the right of the longitudinal axis 39 of the path of the machine, the two supporting rollers 25 form with the trail roller 29, seen in plan view, a triangular base for the haymaking machine. The tipping forces acting on the rear rake wheel 2 which can be only incompletely supported at the points of articulation of the arm 3, are taken up by this base.

Instead of with a three-point suspension, the haymaking machine could also be pulled by the tractor with a single-point articulation, so as to be freely pivotable in a horizontal place.

It had been stated in the beginning that the invention can also be applied to haymaking machines of the kind referred to in which the rake wheels rotate in opposite direction. In this respect the illustration of FIG. 5 shall be compared with that of FIG. 6 and it shall be assumed that the front rake wheel turns in the direction as indicated by the arrow, but the rear sake wheel turns in opposite direction, i.e., in clockwise direction. With this assumption, in the arrangement according to FIG. 5, the two rake wheels cooperate, i.e., a single swath is formed between the two rake wheels, while in the arrangement according to FIG. 6 two swaths are formed which will be situated at the two sides of the range of operation of the two rake wheels.

I claim:

1. A haymaking machine having:
    a pair of rake wheels respectively supported by ground wheels for movement along the ground and driven for rotation about vertical shafts;
    a drawbar;
    a pivotal arm attached to one end of said drawbar for pivotal movement in a horizontal plane about said point of attachment and said two rake wheels mounted at opposite ends of said arm, the first of said rake wheels positioned in fixed relationship to said drawbar and held with its vertical shaft aligned with said drawbar said second rake wheel movable by said pivotal arm to either side of said drawbar; and
    means for holding said pivotal arm in said positions on either side of said draw bar.
2. A hay-making machine according to claim 1 including a trail roller attached to the pivotal arm behind the ground wheel of said second rake wheel and which travels in the track of the ground wheel of said second rake wheel.
3. A haymaking machine according to claim 1 in which said pivotable arm can be locked to an adjusting segment in at least two different angular positions.
4. A haymaking machine according to claim 3, in which said adjusting segment of one of the rake wheels is fixed to a gearbox of the rake wheel drive.
5. A haymaking machine according to claim 3, in which said vertical shafts of the rake wheels, each pass through a control housing and have their lower ends connected to said ground wheels.
6. A hay-making machine having:
    a pair of rake wheels respectively supported by ground wheels for movement along the ground and driven for rotation about vertical shafts;
    a drawbar;
    a pivotal arm attached to one end of said drawbar for pivotal movement in a horizontal plane about said point of attachment and said two rake wheels mounted at opposite ends of said arm, the first of said rake wheels positioned in fixed relationship to said drawbar and held with its vertical shaft aligned with said drawbar, said second rake wheel movable by said pivotal arm to either side of said drawbar
    means for holding said pivotal arm in said position on either side of said drawbar; and
    wherein said rake wheels and said pivotal arm are connected to a coupling frame to be lowered into a position of operation and raised into an inoperative position, said arm and rake wheels when in lowered operative position being freely tiltable on said coupling frame about a horizontal axis extending in the direction of travel of the machine, automatic locking means being provided to prevent tilting movement of said arm and rake wheels when they are raised into inoperative position.
7. A haymaking machine having:
    a pair of rake wheels respectively supported by ground wheels for movement along the ground and driven for rotation about vertical shafts;
    a drawbar;
    a pivotal arm formed of a telescopic tube of adjustable length attached to one end of said drawbar for pivotal movement in a horizontal plane about said point of attachment and said two rake wheels mounted at opposite ends of said arm, the first of said rake wheels positioned in fixed relationship to said drawbar and held with its vertical shaft aligned with said drawbar, said second rake wheel movable by said pivotable arm to either side of said drawbar;
    means for holding said pivotal arm in said positions on either side of said drawbar; and
    in which a gearbox of the rake wheel drive is mounted about said first rake wheel and carries an extension tube rotatably and slidably engaged in a stationary sleeve of the machine, said sleeve being provided with internal gear teeth adapted to engage external gear teeth provided on said extension tube.

* * * * *